United States Patent [19]

Shimano et al.

[11] Patent Number: 4,680,642
[45] Date of Patent: Jul. 14, 1987

[54] PICTURE SCANNING AND RECORDING METHOD WITH SELECTION BETWEEN TWO DIFFERENTLY PROCESSED SIGNALS

[75] Inventors: Noriyuki Shimano; Isao Tokura, both of Uji; Mitsuhiko Yamada, Kyoto, all of Japan

[73] Assignee: Dainippon Screen Seizo Kabushiki Kaisha, Kyoto, Japan

[21] Appl. No.: 616,389

[22] Filed: Jun. 1, 1984

[30] Foreign Application Priority Data

Jun. 7, 1983 [JP] Japan ................................ 58-100236

[51] Int. Cl.[4] .............................................. H04N 1/40
[52] U.S. Cl. ................................... 358/280; 358/283; 358/75
[58] Field of Search ................... 358/75, 280, 283, 298

[56] References Cited

U.S. PATENT DOCUMENTS 3,983,319 9/1976 Moe et al. ............................. 358/75
4,115,816 9/1978 Moe et al. ............................. 358/75
4,486,788 12/1984 Yamada ................................. 358/75

Primary Examiner—James J. Groody
Assistant Examiner—Robert M. Bauer
Attorney, Agent, or Firm—Hayes, Davis & Soloway

[57] ABSTRACT

An original divided in a plurality of regions is photoelectrically scanned and its reproduction is then recorded. Signals from a plurality of photodetectors arranged to detect each desired common region of the original in accordance with a signal representing its corresponding scanning position and its corresponding signal stored in advance in a memory device are selectively switched over and output to the recording side in accordance with sequential scanning of the plurality of regions in the original. The above method assures high productivity without need for special skill or expensive facilities.

5 Claims, 3 Drawing Figures

PICTURE SCANNING AND RECORDING METHOD WITH SELECTION BETWEEN TWO DIFFERENTLY PROCESSED SIGNALS

This invention relates to a method for scanning and recording a picture by exposing and recording a reproduced picture while controlling the recording-side scanning means on the basis of picture signals obtained by photoelectrically scanning an original picture, and more specifically to a method for outputting each picture pattern region as a halftone dot image and each line region as a high-resolution line image faithful to the original to the recording side where the original contains picture pattern regions having dark and light tones and line regions in combination.

Reflecting wide-spread use of the photomechanical color process in recent years, it is desired to improve the productivity in the fabrication of printing plates by means of plate-making color scanners so that a number of color originals may be efficiently reproduced as color-separated halftone dot images. As one method which is purportedly capable of meeting such a demand, it is practiced to a certain limited extent to make color printing plates by using laid-out originals each of which has in advance been prepared by laying out desired color originals, character originals and the like in accordance with a prescribed layout. In many instances, color-printed matters usually contain both picture pattern regions having different tones and regions composed of line images such as characters, patterns and the like (hereinafter called character regions) in mixed fashions. In the case of plate-making scanners which are generally called "direct scanners" and are able to record reproduced images as halftone dot images while performing color separation concurrently, character regions are generally output as halftone dot images too. Hence, the above method is accompanied by a drawback that each of reproduced line images has been reduced in resolution.

Under the present circumstances, the above-mentioned color plate-making method which relies upon laid-out originals is applied merely to some small-quantity printing work.

In the usual color plate-making methods, it has conventionally been practiced to subject only picture pattern regions individually from one original to another to color separation and conversion to halftone dot images by means of a color scanner, to patch the resulting halftone dot images in accordance with a prescribed layout, to prepare on the side a reproduced image with respect to character regions in accordance with the photographic technique, and then to register the thus-patched halftone dot images and the reproduced image together on a single sheet of film for their multiple contact exposure. However, this conventional method is accompanied by such drawbacks that its steps are complex, skilled manual work is required to avoid positioning errors (registering errors) among color-separated plates, and its productivity is low.

On the other hand, there are also apparatus called "layout scanners" the actual adoption of which is progressingly under way in recent years. They can perform arrangement of images and pictures by processing picture signals in the digital fashion and can eventually output and record a laid-out color-separated image. They are however accompanied by a drawback that they require higher expenses for facilities.

An object of this invention is, with a view toward solving or at least improving the drawbacks of the aforementioned conventional methods, to provide a method for recording in a single scanning step each picture pattern region as a color-separated halftone dot image and each character region as a reproduced image, faithful to the original, of high-resolution upon reproducing a laid-out original, in which at least one character region and at least one picture pattern region are contained in combination, by means of a color scanner.

In one aspect of this invention, there is thus provided a picture scanning and recording method, said method including photoelectrically scanning an original divided in a plurality of regions and recording its reproduction, characterized in that signals from a plurality of photodetectors arranged to detect each desired common region of the original in accordance with a signal representing its corresponding scanning position and its corresponding signal stored in advance in a memory device are selectively switched over and output to the recording side in accordance with sequential scanning of the plurality of regions in the original.

The above method can attain the aforementioned object of this invention.

The above and other objects, features and advantages of the present invention will become apparent from the following description and the appended claims, taken in conjunction with the accompanying drawings, in which:

Figure 1:
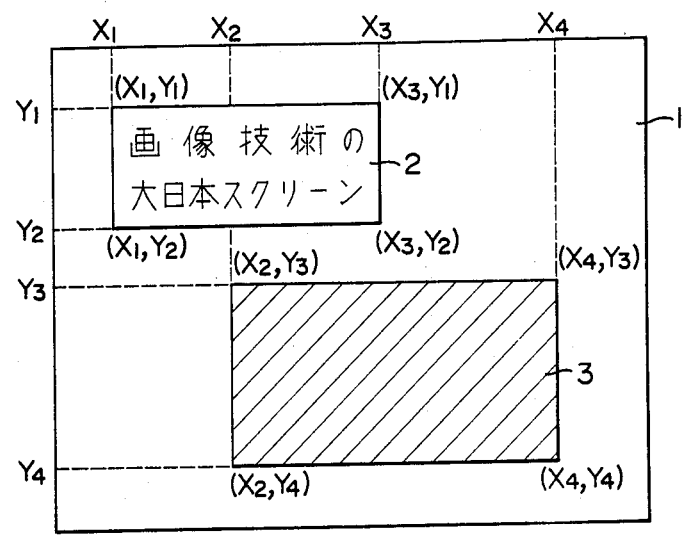
FIG. 1 is a schematic illustration showing one example of originals each of which contains both character regions and picture pattern regions in combination.

Reference is first of all made to FIG. 1, in which an original containing character regions and picture pattern regions in a mixed fashion is illustrated by way of example. For the convenience of explanation, only one character region and picture pattern region are depicted there. In addition, each of the regions is of a rectangular shape which has a pair of parallel sides in the main scanning direction (i.e., along the Y-axis) and another pair of parallel sides in the sub-scanning direction (i.e., along the X-axis). In FIG. 1, the character region 2 has a rectangular shape surrounded by four points indicated respectively by coordinate values $(X_1, Y_1)$, $(X_1, Y_2)$, $(X_3, Y_2)$, and $(X_3, Y_1)$, whereas the picture pattern region 3 has a rectangular shape surrounded by four points indicated respectively by coordinate values $(X_2, Y_3)$, $(X_2, Y_4)$, $(X_4, Y_4)$ and $(X_4, Y_3)$.

Figure 2:
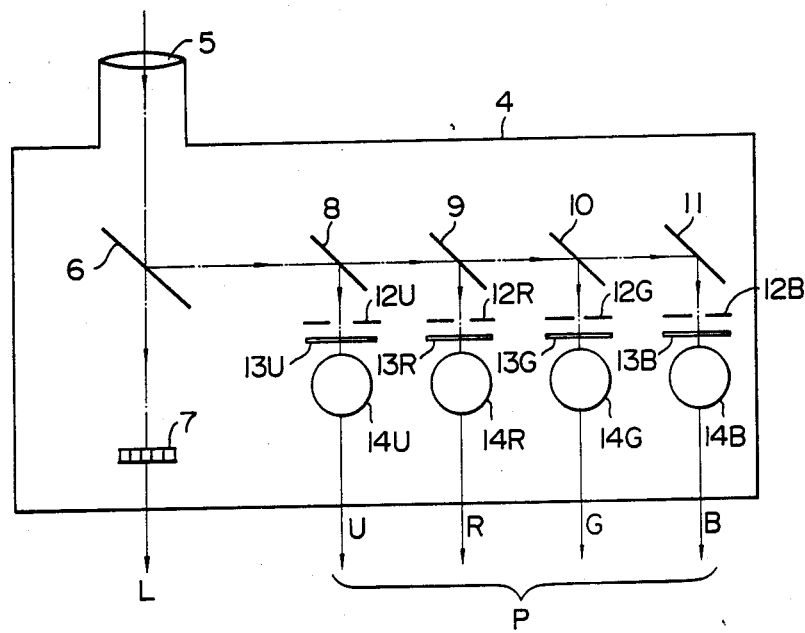
FIG. 2 is a simplified block diagram illustrating the structure of a pickup head useful in the practice of the method of this invention.

FIG. 2 illustrate schematically the structure of a pickup head of a plate-making color scanner useful in the practice of the method of this invention.

A pickup head 4 is provided, as will be described with reference to FIG. 3, facing an original drum 21 which carries an original wrapped thereon. Luminous flux, which has been reflected from a small spot on the original as a result of radiation of a light beam onto the small spot, is allowed to enter through a lens 5. The luminous flux is then branched by a half-mirror 6. A portion of the luminous flux travels to a line sensor 7 which is constructed of a plurality of photoelectric conversion elements. The remaining portion of the luminous flux are in turn branched into four flux portions respectively by halfmirrors 8, 9, 10 and a total reflection mirror 11. The flux portions pass through their respective slits 12 and color separation filters 13 and then enter their respective photoelectric conversion elements 14. From these four photoelectric conversion elements 14, there are respectively output an unsharp signal U, which is adapted to emphasize the shaprness of a reproduced image corresponding to the picture pattern region 3, and a color-separated red signal R, color-separated green signal G and color-separated blue signal B. Detailed description of the operation of the pickup head is however omitted herein, because it is similar to the color separation and scanning method commonly practiced in known plate-making color scanners or facsimile systems.

On the other hand, the line sensor 7 is composed of a plurality of photoelectric conversion elements arrayed in a direction which crosses main scanning lines. By projecting an image portion of the original, which image protion is equivalent to the width of each scanning line, by means of an unillustrated, suitable optical system, the line sensor 7 outputs picture signals L with a fineness obtained by dividing the width of the scanning line into the number of the photoelectric conversion elements.

Namely, the pickup head 4 depicted in FIG. 2 outputs at the same time a signal L to be applied for scanning and recording the character region 4 and color-separated picture signals U, R, G, B (hereinafter called signals P as a whole). Therefore, it is necessary to switch the former signal to the latter signals or vice versa depending which regions is being scanned in the course of each scanning operation of the original, so that either one of the former signal and latter signals is selected.

Figure 3:
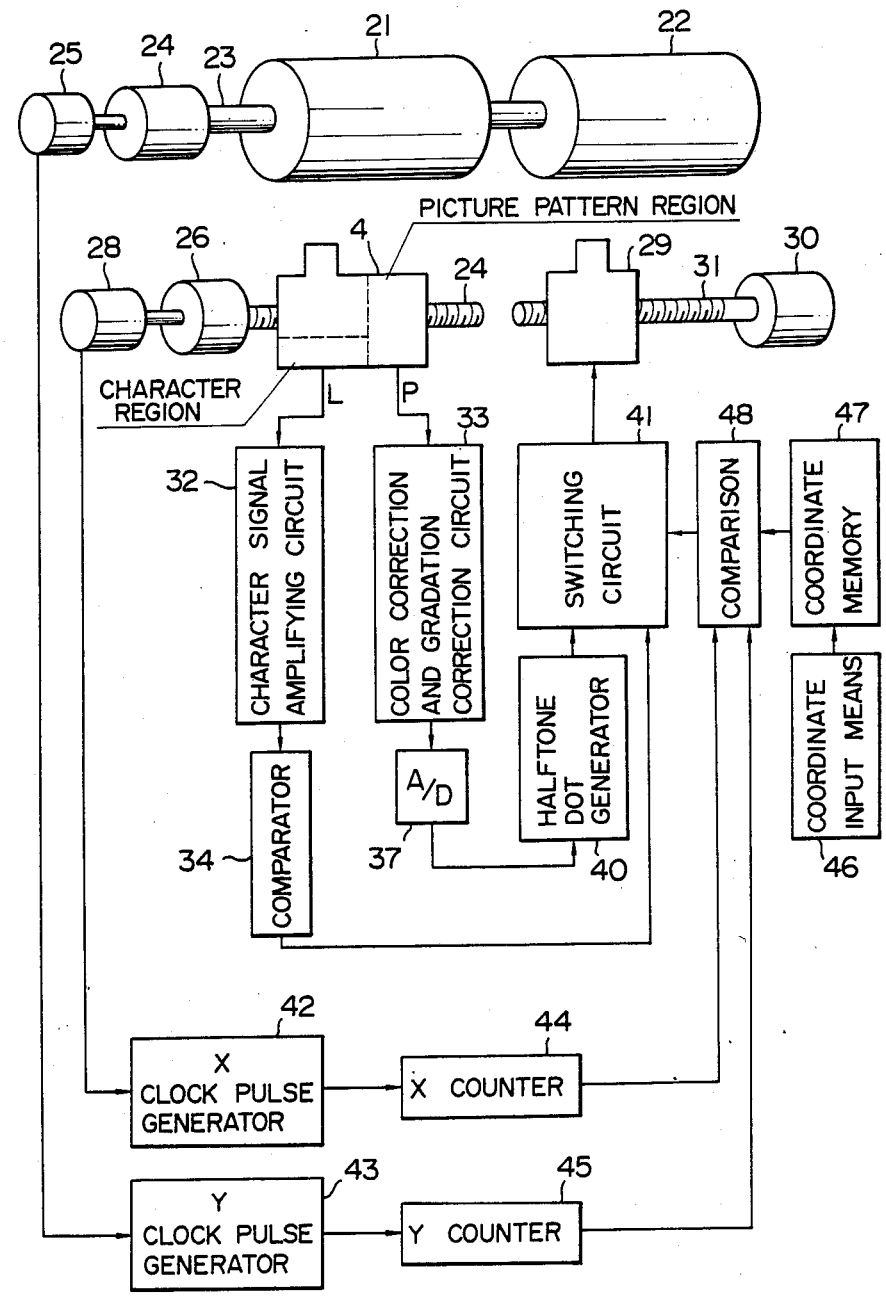
FIG. 3 is a block diagram showing one example of systems useful in the practice of the method of this invention by means of a plate-making color scanner.

FIG. 3 is a schematic illustration showing the structure of a plate-making color scanner provided with means adapted to perform such a switching operation. An original drum 21 and recording drum 22 are connected together by means of a shaft 23 and are rotated by a motor 24. A rotary encoder 25, which is driven coaxially or synchronously with the two drums, generates clock pulses in synchronization with the rotation of the drums.

The original drum 21 is wrapped with the original 1 in which the character region 2 and picture pattern region 3 are placed side by side as shown in FIG. 1. On the other hand, a photosensitive material (for example, photographic film) is wrapped over the recording drum 22.

The pickup head 4 is arranged at the side of the original drum 21. The pickup head 4 is moved along the axis of the drum 21 by a feed screw 24 which is in turn driven by a motor 26. The pickup head 4 projects a minute light spot onto the original by unillustrated lighting means and outputs picture signals by the means described above with reference to FIG. 2. In addition, a rotary encoder 28 which is driven either coaxially or synchronously with the feed screw 24 is additionally provided, whereby to generate clock pulses in synchronization with movements of the pickup head 4.

On the other hand, an exposure head 29 is disposed at the side of the recording drum 22. The exposure head 29 is moved along the axis of the drum 22 by a feed screw 31 which is in turn driven by a motor 30. Recording picture signals are input to the exposure head 29 so that a desired reproduced image is exposed and recorded on the photosensitive material wrapped over the drum 22.

Detailed description of these drums, heads, drive mechanisms and the like is omitted herein, because they may be constructed in much the same way as their corresponding elements in known plate-making color scanners.

Each character signal L, which has been output from the pickup head 4, is amplified by a character signal amplifying circuit 32 and is then processed in comparison with a threshold at a comparator 34.

On the other hand, each picture pattern signal P output from the pickup head 4 is input to a color correction and gradation correction circuit 33, which is the same as that used in a conventionally-known plate-making color scanner, so as to subject the picture pattern signal P to desired corrections. Then, the thus-corrected picture pattern signal is A/D-converted at an A/D converter 37, followed by transmission of the resultant signal to a halftone dot generator 40.

Both of the signals L, P, which have been subjected to such prescribed processings as mentioned above, are then input to a switching circuit 41, where both of the signals L, P are selectively switched depending whether the character region 2 or the picture pattern region 3 is recorded. The thus-selected signal is then fed to the exposure head 29.

This switching operation is performed in the following manner by the apparatus illustrated in FIG. 3.

Pulses, which have been generated corresponding to the extent of movement of the pickup head 4 in the sub-scanning direction (X-axis) from the rotary encoder 28 attached to the motor 26 for the pickup head 4, are converted to clock pulses having a prescribed pitch by means of an X clock pulse generator 42. On the other hand, pulses generated corresponding to the extent of rotation of the original drum 21 from the rotary encoder 25 attached to the original drum 21 are converted in the same manner by a Y clock pulse generator 43. These clock pulses are input respectively to subsequent X counter 44 and Y counter 45.

Accordingly, the X counter 44 counts clock pulses, which are proportional to the extent of the movement of the pickup head 4 in the sub-scanning direction, taking the starting end (for example, the left end) of the movement stroke of the pickup head 4 as 0 (zero) point. On the other hand, the Y counter counts clock pulses, which are proportional to the angle of rotation of the drum 21, taking a standard point on the original point 21 (for example, the upper edge of the original 1) as 0 (zero) point.

On the other hand, preset at a coordinate memory 47 by coordinate input means 46 are coordinate values of the edge corners of the character region 2 and picture pattern region 3 on the original 1, namely, such numeral values as $X_1, X_2, \ldots, Y_1, Y_2, \ldots$ in FIG. 1 and data commanding switching of the signal P to the signal L and vice versa at these coordinate values. These preset data are then input to a comparison circuit 48.

The counts of the X counter 44 and Y counter 45 are compared respectively with the above-described preset values at the comparison circuit 48. When the counts are coincided with the present values, the switching circuit 41 is actuated in accordance with predetermined control routine.

The above control may be carried out in the following manner. In the example illustrated in FIG. 1, none of the signals L, P is output while X counts fall between "0" and "$X_1$". From "$X_1$" to "$X_2$", character signals L are output only when Y counts remain from "$Y_1$" to "Y₂". While X counts are from "X₂" to "X₃", character signals L are output when Y counts remain from "Y₁" to "Y₂" but picture pattern signals P are output when Y counts remain from "Y₃" to "Y₄". Here, none of the signals L, P is output so long as Y counts are "0—Y₁", "Y₂—Y₃" or "Y₄<". When the pickup head 4 moves further and X counts fall between "X₃" to "X₄", picture patterns signals P are output only when Y counts remain from "Y₃" to "Y₄" but none of the signals L, P is output over the entire range of the Y-axis when X counts have exceeded "X₄".

In the manner described above, it is possible to record a reproduced image, which is to be exposed and recorded, as a line image having high resolution and being faithful to the original with respect to the character region 2 and as a color-separated halftone dot image with respect to the picture pattern region 3.

The present invention has been described above on the basis of the embodiment illustrated in the drawings. It should however be borne in mind that various means, which are commonly used in the picture scanning and reproducing means of plate-making color scanners, color facsimiles or the like, may also be employed in place of the above-described means.

In addition to the above-described line sensor, it is possible for example to arrange the end faces of a plurality of optical fibers, as means for outputting character signals L to record each character region at high resolution, in an array on the light-receiving plane, and to provide photoelectric conversion elements in opposition to the other end faces of their corresponding fibers.

In the above descrition, coordinate values are designated for each of the character region 2 and picture pattern region 3. It may also be feasible to reproduce the original by designating merely either one of the regions 2, 3 in terms of its corresponding coordinate values and defining the other region inclusive of margins under other conditions.

It is also possible to apply a digitizer table, key board or the like for example as the coordinate input means 46. Furthermore, the method of this invention may be applied not only to such drum-type scanning apparatus as shown in FIG. 3 but also to plane-scanning apparatus.

Having now fully described the invention, it will be apparent to one of ordinary skill in the art that many changes and modifications can be made thereto without departing from the spirit or scope of the invention as set forth herein.

What is claimed is:

1. A picture scanning and recording method, wherein said method includes:
    placing an original picture, having a plurality of regions, on a recording drum,
    arranging a plurality of photodetectors to detect each region of the original picture,
    scanning photoelectrically the original picture and generating a plurality of picture signals and pulse values,
    processing each picture signal into at least two different processed signals,
    and selecting, depending upon a comparison of the pulse value and preset data stored in a memory, which processed signal is to be outputted to a recording head.

2. A picture scanning and recording method as claimed in claim 1, wherein said method includes a further step of determining character regions from picture pattern regions.

3. A picture scanning and recording method as claimed in claim 1, wherein said scanning step further includes scanning at various detection and resolution levels.

4. A picture scanning and recording method as claimed in claim 1, wherein said method includes a further step of outputting signals for at least one character region, produced in accordance with line signals of high resolution, and at least one continuous picture image region, produced as a color-separated halftone dot image.

5. A picture scanning and recording method as claimed in claim 1, wherein said method includes a further step of designating, by preset data stored in a memory, regions requiring reproduction conditions different from those required for other regions of the plurality of regions in the original picture, wherein the processed signals of at least two types are switched from one to another as scanning locations coincided with the preset data.

* * * * *